United States Patent [19]

Wolpert

[11] 4,115,937

[45] Sep. 26, 1978

[54] DISPLAY FRAME

[75] Inventor: Stanley Wolpert, Syosset, N.Y.

[73] Assignee: Loomskill, Inc., New York, N.Y.

[21] Appl. No.: 757,255

[22] Filed: Jan. 6, 1977

[51] Int. Cl.$^2$ .............................................. G09B 25/00

[52] U.S. Cl. .......................................... 35/55; 40/606; 40/611

[58] Field of Search ............ 35/55, 56; 40/156, 125 H

[56] References Cited

U.S. PATENT DOCUMENTS

| | | | |
|---|---|---|---|
| 1,183,876 | 5/1916 | Heligers | 35/55 |
| 1,283,369 | 10/1918 | Tyler | 35/55 |
| 1,530,082 | 3/1925 | Hutter | 35/55 |
| 2,581,101 | 1/1952 | Hirsch | 35/55 |

*Primary Examiner*—Russell R. Kinsey
*Assistant Examiner*—Wenceslao J. Contreras
*Attorney, Agent, or Firm*—Howard I. Podell

[57] ABSTRACT

A display frame for mounting a pattern of cloth behind a transparent overlay sheet marked with the outline of a model wearing a dress, so that the display cloth may be viewed as a finished modeled dress. The rack is formed of a pair of spaced vertical members spaced apart by upper and lower horizontal struts, each mounted on a pedestal, with a horizontal hanger of circular cross-section joined to both vertical members and located a spaced distance below the upper horizontal strut. Each of the vertical members is formed with a through open axial slot extending in the transverse plane of the frame, for retention of a flat display board between the two vertical members, and theaded fasteners are mounted in each vertical member for clamping of the board in the slot. A length of cloth may be fastened to each face of the display board, with the transparent overlay sheet hung over the hangar rod to cover both faces of the display board. The elements of the frame are detachably mounted together so that the frame may be readily disassembled for purposes of shipping or storage.

4 Claims, 6 Drawing Figures

DISPLAY FRAME

SUMMARY OF THE INVENTION

My invention is a display frame for mounting a pattern of cloth behind a transparent overlay sheet marked with the outline of a model wearing a dress, so that the display cloth may be viewed as a finished modeled dress.

The rack is formed of a pair of spaced vertical members spaced apart by upper and lower horizontal struts, each mounted on a pedestal, with a horizontal hangar rod of circular cross-section joined to both vertical members and located a spaced distance below the upper horizontal strut. Each of the vertical members is formed with a through open axial slot extending in the transverse plane of the frame, for retention of a flat display board between the two vertical members, and threaded fasteners are mounted in each vertical member for clamping of the board in the slot.

A length of cloth may be fastened to each face of the display board, with the transparent overlay sheet hung over the hangar rod to cover both faces of the display board. The elements of the frame are detachably mounted together so that the frame may be readily disassembled for purposes of shipping or storage.

By means of my invention, a length of cloth may be readily mounted in place beneath a hanging overlay of a model wearing a dress so that the cloth may be displayed as a finished dress. Various patterns of cloth may be individually displayed by substitution of various display boards, each covered with a different swath of cloth and alternately various patterns of dress design may be substituted for a given display by removal and replacement of the overlay which freely hangs in place over the hangar rod.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
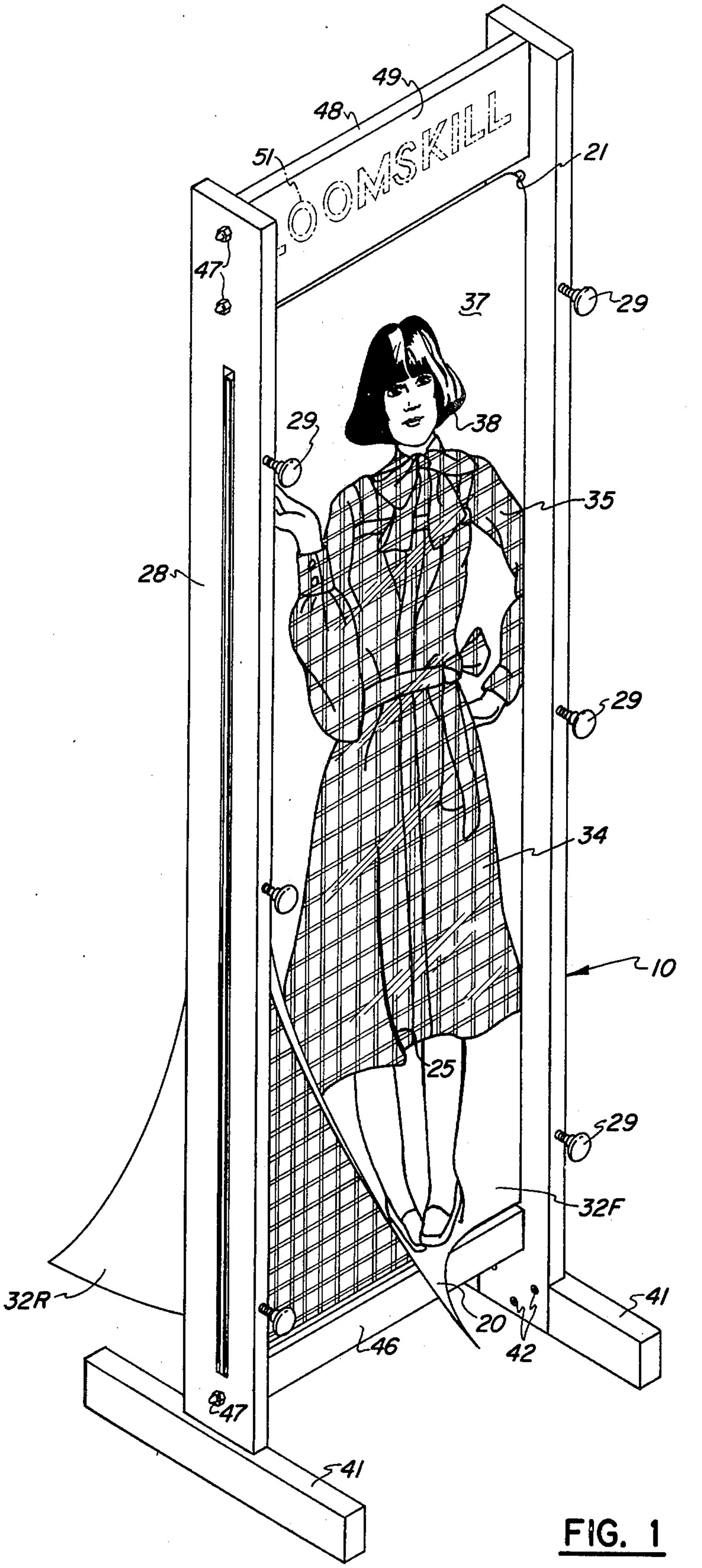
FIG. 1 is a perspective view of the invention in use.

Turning now descriptively to the drawings, in which similar reference characters denote similar elements throughout the several views, FIG. 1 illustrates the assembled display frame 10 with an overlay sheet 20 hung about horizontal hangar rod 21 to extend over the front and rear of the frame 10 over a swath of patterned cloth 23 mounted on a flat plate 24 that is detachably clamped in slots 26 of spaced vertical members 28 by clamp screws 29.

Figure 3:
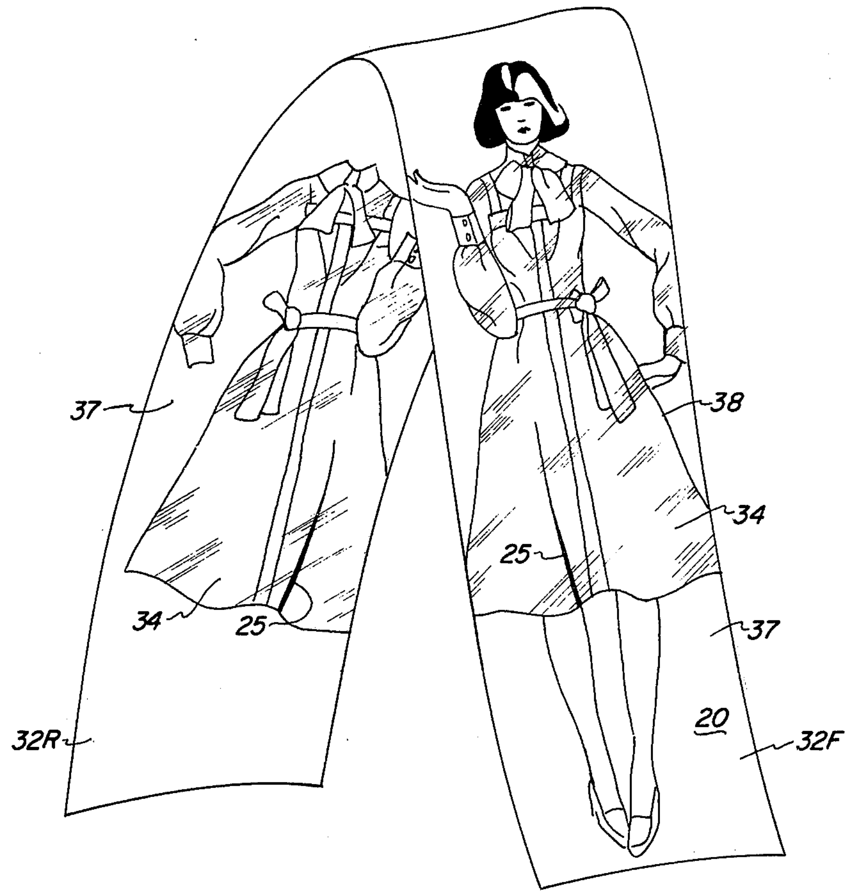
FIG. 3 is a perspective view of the overlay sheet.

Overlay sheet 20, as shown in FIGS. 1 and 3, is formed of a transparent flexible material on which the outline 38 of a model 35 is drawn in opaque ink bounding a transparent section 34 in the form of a dress worn by the model 35 and with the background section 37 coated with an opaque ink and with opaque dress fold lines 25 drawn in the transparent section 35 so that the patterned cloth 23 under the overlay sheet 20 appears to a viewer as a dress which the pictured model is wearing. The front face 32F and the rear face 32R of overlay sheet 20 may be marked with different shapes of dresses for display of the cloth 23 as seen on different dress designs with a different swath of cloth 23 fixed over the front face 33F and the rear face 33R of the flat plate 24.

Clamp screws 29 are each formed with a knurled head 49 for convenience of manual grip when tightening or loosening.

The display frame 10 is readily assembled in place from components that can be stored or transported in the disassembled state so that the frame 10 may be carried for sales purposes to exhibits or sales conferences in knock-down form, and quickly set up for display of the various patterns of cloth mounted on individual plate 24.

Figure 2:
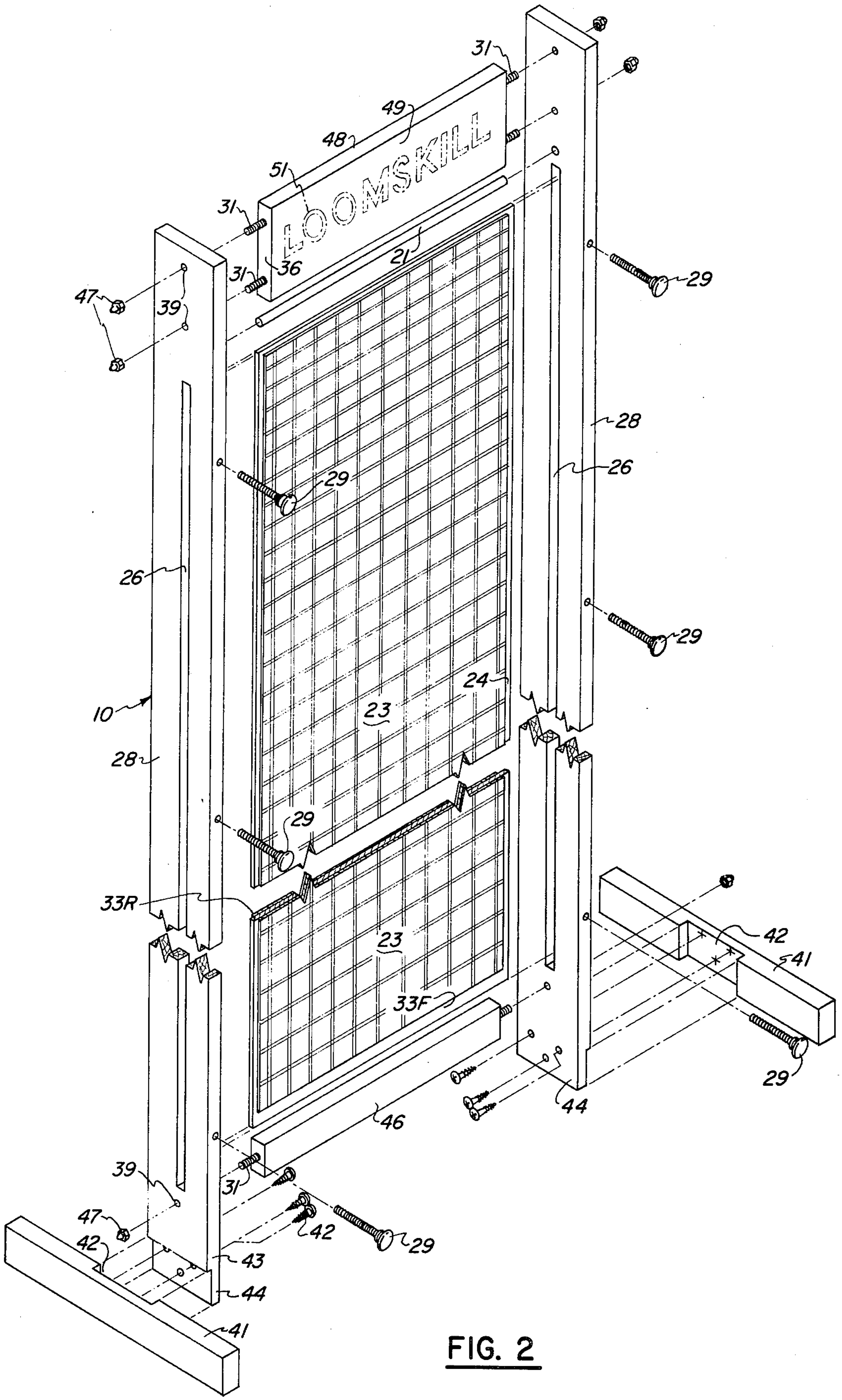
FIG. 2 is an exploded perspective view of the invention.

As shown in FIGS. 1–2, each vertical member 28 is detachably fastened by bolts 42 to an individual horizontal pedestal 41 that extends both forward and rearwards of the vertical member 28 with each pedestal 41 formed with a recess groove 42 of a size to non-rotatably engage an extended tongue section 44 projecting from the lower section 43 of the vertical member. A horizontal lower spacer 46 and upper spacer 48 are bolted to the vertical members 28 with horizontal hangar rod 21 mounted between and to both vertical members 28 a spaced distance below upper spacer 48 to permit sliding the overlay sheet 20 over hangar rod 21. Preferably hangar rod 21 is of circular cross-section to avoid scratching the overlay sheet 20.

Clamp screws 29 are threaded in each vertical member 28 to each extend into slot 26 so as to clamp a plate 24 extending between vertical members 28 through slots 26.

Cloth swath 23 may be fastened directly to a plate 24 or alternately, the swath may be held in place against plate 24 by the clamp screws with the cloth extending into each slot 26.

Upper horizontal spacer 48 is preferably of rectangular cross-section so that the external face 49 serves as a surface on which sales or advertising information may be marked with indicia 51. Headless screws 31 each project from the opposed end surface 36 of upper spacer 48 and lower spacer 46 to each engage a hole 39 in abutting vertical member 28 with nuts 47 serving to fasten screws 31 in the assembled condition.

Figure 5:
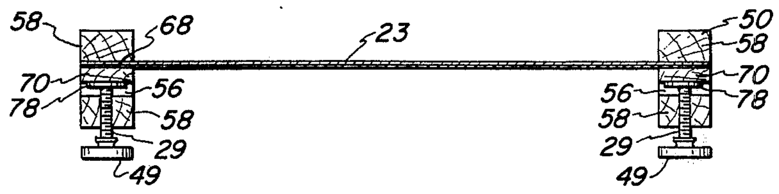
FIG. 5 is a sectional view taken along line 5—5 of FIG. 4.
Figure 4:
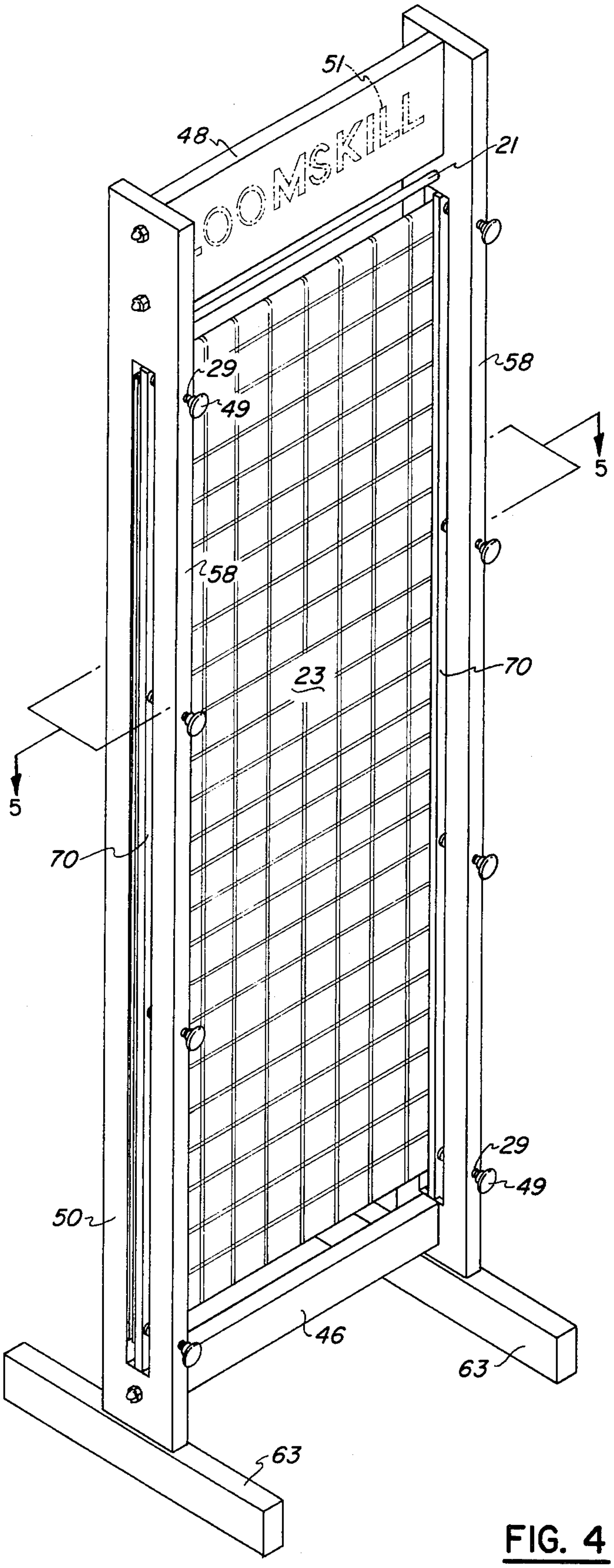
FIG. 4 is a perspective view of an alternate embodiment of the invention.
Figure 6:
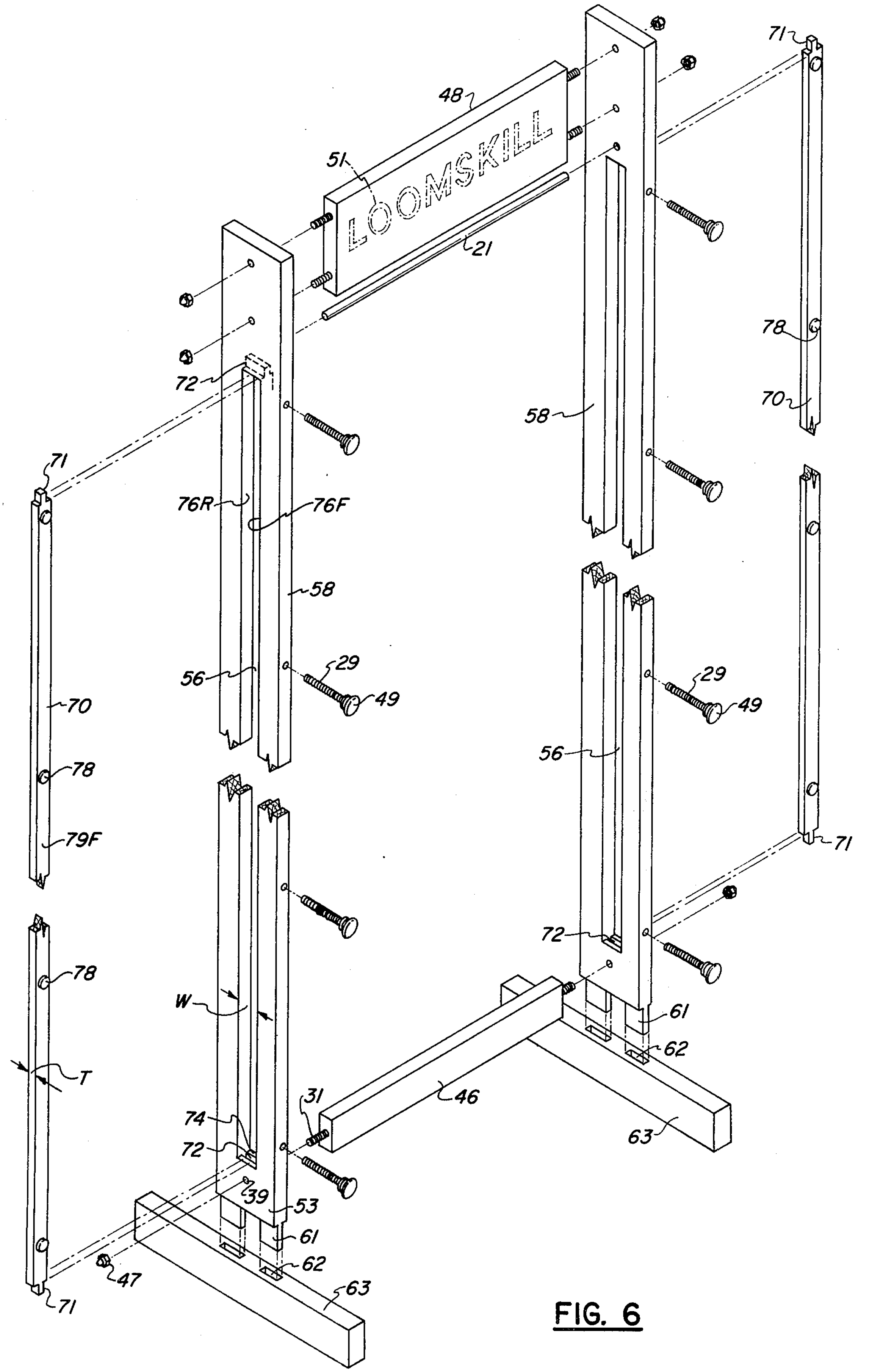
FIG. 6 is an exploded perspective view of the alternate embodiment.

FIGS. 4–6 illustrate an alternate embodiment display frame 50 of generally similar construction which permits the display of a swath of cloth 23 which does not necessarily require mounting to a backing plate 24, although cloth mounted to a backing plate 24 may be employed as desired.

Spaced vertical members 58 are joined by an upper spacer 48, a lower spacer 46 and a hangar rod 21 similarly to frame 10. A pair of tongues 61 projecting from the base section 53 of each vertical member each extend into a vertical slot 62 in a pedestal 63.

A vertical slot 56 extends in each vertical member 58 along the axis of the vertical member, with a clamp bar 70 loosely mounted in each slot 56. Clamp bar 70 is loosely held in slot 56 by opposed projecting tongues 71 that each loosely fit in a blind recess 72 in the upper and lower end walls 74 of each slot 56 of each vertical member 28, with the thickness T of clamp bar 70 being considerably less than the depth W slot 56 and with blind recesses 72 of the vertical members extending the full depth of the slot end wall 74 to permit a clamp bar 70 to freely travel in slot 56 between the forward and the rear slot walls 76F and 76R respectively, except when bar 70 is clamped against rear slot wall 76R by tightening of clamp screws 29. Bearing plates 78 are fixed to the forward face 79F of each clamp bar 70 and each located to intersect the axis of a clamp screw 29 so that the end of each tightened clamp screw 29 will bear against a bearing plate 78.

As shown in FIGS. 5-6, a swath of cloth 23 may be detachably fixed in frame 50 by clamping each opposed side edge 68 of the cloth 23 between a clamp bar 70 and the rear face 76R of the associated vertical member 58, with clamp screws 29 tightened against clamp bar bearing plates 78. An overlay sheet 20 may then be hung over bar 21 to display the cloth 23 in the form of a modeled dress.

Having thus described the invention, what I claim as new and desire to secure by Letters Patent of the United States is:

1. A display frame for mounting of a swath of cloth behind a marked transparent overlay sheet so as to display the mounted cloth in the form of a garment worn by a pictured model comprising an open frame bounded by a pair of spaced vertical members each joined to a base pedestal and joined together by spaced horizontal means, a hangar rod mounted to the vertical members so as to extend between said vertical members, with each vertical member formed with a through slot extending a substantial length of the said vertical member, said vertical members each fitted with means to detachably clamp a side edge of a swath of cloth in a said slot so that the swath is suspended between the vertical members below the hangar rod, said hangar rod adaptable for suspending a transparent overlay sheet over the length of the suspended cloth, in which each said slot of a vertical member extends between the opposed sides of the vertical member so that a common plane may pass through the through slots of the two vertical members, such that a swath of cloth may be fastened in, or removed from, the frame sidewise through the said slots independently of the suspended overlay, and the overlay may be replaced independently of the suspended swath.

2. The combination as recited in claim 1 in which the clamp means include fasteners mounted to each vertical member that project into the through slot.

3. The combination as recited in claim 1 in which a bar is loosely mounted in each slot said bar being of less thickness than the depth of the slot along the axis of thickness of the bar so that the bar may be clamped against an edge of a swath of cloth fitted between the bar and a wall of the slot, together with means to clamp said bar against the said wall of the slot so as to clamp the edge of a swath of cloth fitted between the bar and said slot wall.

4. The combination as recited in claim 1 together with a swath of cloth mounted to a plate, said plate of a size to extend between said vertical members and extend on each side into the slot of each vertical member, together with a transparent flexible sheet hung from the hangar rod over a said swath of cloth fastened in the slots of the vertical member, said overlay sheet covered with a opaque background bounding a transparent section, said transparent section of a shape to simulate a garment.

* * * * *